United States Patent
Flament et al.

(10) Patent No.: US 9,778,032 B2
(45) Date of Patent: Oct. 3, 2017

(54) METHOD FOR PREDICTION AND CONTROL OF TIRE UNIFORMITY PARAMETERS FROM CROWN THICKNESS VARIATION

(75) Inventors: Julien Matthieu Flament, Clermont-Ferrand (FR); Verner Steve Nicholson, Pelzer, SC (US); Anton Felipe Thomas, Greer, SC (US); James Michael Traylor, Greer, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 592 days.

(21) Appl. No.: 13/990,843

(22) PCT Filed: Dec. 2, 2010

(86) PCT No.: PCT/US2010/058648
§ 371 (c)(1),
(2), (4) Date: May 31, 2013

(87) PCT Pub. No.: WO2012/074527
PCT Pub. Date: Jun. 7, 2012

(65) Prior Publication Data
US 2013/0253686 A1    Sep. 26, 2013

(51) Int. Cl.
*G05B 15/02* (2006.01)
*G01B 21/20* (2006.01)
*G01M 17/02* (2006.01)

(52) U.S. Cl.
CPC ............ *G01B 21/20* (2013.01); *G01M 17/02* (2013.01); *G05B 15/02* (2013.01)

(58) Field of Classification Search
USPC .......................................... 700/117; 702/167
See application file for complete search history.

(56) References Cited

U.S. PATENT DOCUMENTS 3,762,056 A    10/1973   Wolfe
5,054,918 A *  10/1991   Downing ........... G01B 11/2504
                                              33/203

(Continued)

FOREIGN PATENT DOCUMENTS

JP    2001-141615    5/2001
JP    3507945 B2     3/2004

OTHER PUBLICATIONS

PCT International Search Report for PCT/US2010/058648, dated Feb. 7, 2011 9 pages.

(Continued)

Primary Examiner — Miranda Huang
Assistant Examiner — Olvin Lopez Alvarez
(74) Attorney, Agent, or Firm — Dority & Manning, P.A.

(57) ABSTRACT

Improved and more easily implemented methods for predicting uniformity parameters such as uneven mass distribution, radial run out and high speed radial force variation utilize other measurements such as the tire crown thickness variation. When high speed radial force variation is calculated, low speed radial force variation is also measured. Tire crown thickness variation can be measured in different fashions depending on the particular tire manufacturing process employed. By electronically determining resultant uniformity parameters, tires can be improved by rectification to address the uniformity levels. In addition, tire manufacturing can be improved by altering the resultant location of tire crown thickness variation relative to other aspects of the tire and/or tire manufacturing process.

9 Claims, 7 Drawing Sheets

(56) References Cited

U.S. PATENT DOCUMENTS

| | | | |
|---|---|---|---|
| 5,396,438 A | 3/1995 | Oblizajek | |
| 6,065,331 A | 5/2000 | Fukasawa | |
| 6,139,401 A * | 10/2000 | Dunn | B24B 5/366 |
| | | | 451/10 |
| 6,257,956 B1 * | 7/2001 | Shteinhauz | G01M 17/022 |
| | | | 451/10 |
| 6,579,389 B1 * | 6/2003 | Kobayashi | B60C 19/00 |
| | | | 152/154.1 |
| 6,609,074 B2 | 8/2003 | Shteinhauz | |
| 7,082,816 B2 | 8/2006 | Zhu | |
| 7,213,451 B2 | 5/2007 | Zhu et al. | |
| 8,712,720 B2 * | 4/2014 | Nicholson | G01M 17/02 |
| | | | 340/442 |
| 2002/0177964 A1 | 11/2002 | Shteinhauz | |
| 2003/0149542 A1 * | 8/2003 | Chang | G01M 17/02 |
| | | | 702/145 |
| 2004/0020583 A1 | 2/2004 | Zhu et al. | |
| 2005/0216224 A1 * | 9/2005 | Obunai | G01M 17/022 |
| | | | 702/145 |
| 2005/0262933 A1 | 12/2005 | Zhu et al. | |
| 2006/0231191 A1 * | 10/2006 | Mawby | B29D 30/0662 |
| | | | 156/110.1 |
| 2007/0000594 A1 * | 1/2007 | Mawby | B29D 30/0061 |
| | | | 156/110.1 |
| 2007/0084541 A1 * | 4/2007 | Moriguchi | B29D 30/0061 |
| | | | 156/117 |
| 2007/0144657 A1 * | 6/2007 | Flament | B29D 30/0662 |
| | | | 156/110.1 |
| 2008/0148805 A1 * | 6/2008 | Mahoney | G01M 17/02 |
| | | | 73/1.08 |
| 2009/0260743 A1 * | 10/2009 | Mawby | B29D 30/0061 |
| | | | 156/110.1 |
| 2010/0180676 A1 * | 7/2010 | Braghiroli | G01M 17/027 |
| | | | 73/146 |
| 2013/0090879 A1 * | 4/2013 | Estor | G06F 17/40 |
| | | | 702/97 |

OTHER PUBLICATIONS

D.S. Stutts, W. Soedel, and S.K. Jha, "Fore-Aft Forces in Tire-Wheel Assemblies Generated by Unbalances and the Influence of Balancing", *Tire Science and Technology*; TSTCA, vol. 19. No. 3, Jul.-Sep. 1991, pp. 142-162.

Lopez et al. ; Modeling the vibrations of a Rotating Tyre: A Model Approach, Forum Acusticum; 2005, pp. 1219-1224.

* cited by examiner

METHOD FOR PREDICTION AND CONTROL OF TIRE UNIFORMITY PARAMETERS FROM CROWN THICKNESS VARIATION

FIELD OF THE INVENTION

The present subject matter generally concerns technology for using crown thickness variation measurements to characterize different harmonic components of tire uniformity performance parameters, such as radial run out, uneven mass distribution and high speed radial force variation. Characterization and prediction of such tire uniformity parameters and others may be used subsequently to characterize or correct manufactured products and/or to improve manufacturing aspects thereof.

BACKGROUND OF THE INVENTION

Tire non-uniformity relates to the symmetry (or lack of symmetry) relative to the tire's axis of rotation in mass, geometric or stiffness characteristics. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of perceived vibration transmitted to the vehicle occupants has been categorized as the "ride comfort" or "comfort" of the tires.

Many different factors can contribute to the presence of non-uniformities in tires, even when the tires are built under seemingly identical process conditions. Examples of such factors include the location of product start points and/or joint overlap locations for one or more of the many complex tire building products and/or steps. Exemplary products include the casing textile plies, the belt plies, bead rings, the inner liner, the tread and other rubber layers. Steps involving these and other products include the application of such products to a form or drum, placing the resulting green tire in a mold or press and subjecting the green tire to heat and pressure to shape and cure the rubber products and bond the materials into an integrated unit.

Tire uniformity characteristics, or parameters, are generally categorized as dimensional or geometric variations (radial run out (RRO) and lateral run out (LRO)), mass variation or uneven mass distribution, and rolling force variations (radial force variation, lateral force variation and tangential force variation, sometimes also called longitudinal or fore and aft force variation). Measuring one or more of the above parameters at high speed provides high speed uniformity (HSU) characteristics for a tire. Uniformity measurement machines often calculate the above and other uniformity characteristics by measuring force with a load cell located either at the tire hub or in a road wheel or the like.

One type of uniformity parameter that is of particular interest in the automotive industry corresponds to radial force variations at generally high speeds, such as those in excess of about 25 mph. Many tire manufacturers have started implementing or are being pressured to implement HSU control by addressing high speed radial force variation (HSRFV). Direct measurement of tire HSU parameters, including HSRFV, however, has been difficult and quite costly, making industrial control rather difficult. To avoid the expense and difficulty associated with direct high speed uniformity measurement in the factory setting, some in the tire industry have focused on predicting HSU by correlating more readily accessible low speed uniformity (LSU) measurements to various HSU attributes. These correlations have ranged on a continuum from purely phenomenological to purely statistical in nature, but many have had only limited success.

One known attempt at predicting tire HSU is disclosed in U.S. Pat. No. 5,396,438 (Oblizajek), which predicts HSU based on multiple low speed parameters such as radial run out (RRO), instantaneous rolling radius (IRR), and radial force variation (RFV) as obtained on low speed uniformity machines.

Yet another example related to aspects of high speed uniformity is found in U.S. Pat. No. 6,065,331 (Fukasawa), which predicts higher order components of high speed uniformity based on low speed uniformity measurements.

Another known technique for predicting and controlling tire HSU is disclosed in U.S. Pat. No. 7,082,816 (Zhu), owned by the present Applicant. In the Zhu '816 patent, technology is disclosed for characterizing both uneven mass distribution and high speed uniformity of a tire based on a functional model derived by representing a tire as a generally circular flexible ring. Although this approach has proven value, the functional model employed in the Zhu '816 patent can sometimes be difficult to implement in practice. In addition, such model does not account for certain aspects of crown deformation. Still further, modeling the tire as a simple ring fails to account for differences in tire structure and performance over a range of lateral locations across a tire crown. Finally, such model sometimes lacks flexibility and ease of implementation because it is locked into a phenomenological model with various parameter assumptions tied thereto.

Although known technology for characterizing tire high speed radial force variation and uneven mass distribution and affecting associated aspects of tire manufacturing have been respectively developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved methodology has been provided to electronically predict certain tire parameters such as high speed radial force variation and uneven mass distribution based on other measured values, such as crown thickness variation.

One exemplary embodiment of the present subject matter relates to a method of electronically determining a uniformity parameter for a tire, such as the uneven mass distribution or radial run out, from measured levels of tire crown thickness variation. Such method may involve various steps, including measuring the crown thickness variation for the tire, identifying one or more tire parameters associated with the tire, and electronically calculating one or more uniformity parameters for the tire (e.g., uneven mass distribution and/or radial run out) from the measured crown thickness variation and the identified tire parameters. In more particular embodiments, the one or more tire parameters associated with the tire include tire density ($\rho$), width (w), radius ($R_o$) and a stiffness coefficient). When uneven mass distribution ($UMD_h$) for one or more harmonics (h) is calculated using measured thickness variation ($t_h$) and selected tire parameters, the following calculation model can be used:

$$\overline{UMD_h} = \frac{\pi}{2}\rho w R_0^2 \overline{t_h}.$$

When radial run out ($\Delta RRO_h$) for one or more harmonics (h) is calculated using similar parameters, the following calculation model can be used:

$$\overline{\Delta RRO_h} = \frac{\omega^2 \pi \rho w R_0^2 \overline{t_h}}{2K_h^e}.$$

Another exemplary embodiment of the disclosed technology concerns a method of electronically determining high speed radial force variation for a tire based on measured crown thickness variation and low speed radial force variation. Such method may include various steps, such as but not limited to measuring the crown thickness variation for the tire, measuring the low speed radial force variation for the tire, identifying one or more tire parameters associated with the tire, and electronically calculating the high speed radial force variation for the tire from the measured crown thickness variation, the measured low speed radial force variation and the identified tire parameters. In more particular embodiments, the one or more tire parameters may include tire density ($\rho$), tread width (w), radius ($R_0$), a first stiffness coefficient ($K_h^e$), a second stiffness coefficient ($K_{zz}$), rotational speed ($\omega$), damping ratio ($\zeta$), and natural frequency ($\Omega_0$).

The high speed radial force variation ($\overline{HSRFV_h}$) can be calculated for one or more harmonics (h) using the following model:

$$\overline{HSRFV_h} = |A(h\omega)|Q(\angle A(h\omega))\left(\overline{LSRFV_h} + \omega^2 \frac{K_{zz}}{K_h^e}\frac{\pi}{2}\rho w R_0^2 \overline{t_h}\right),$$

where $\overline{t_h}$ represents the crown thickness variation for one or more harmonics (h), $\overline{LSRFV_h}$, represents the low speed radial force variation for one or more harmonics (h), $A(h\omega)$ is an amplification factor dependent on the damping ratio ($\zeta$) and natural frequency ($\Omega_0$), and $Q(\theta)$ is a rotation matrix.

In accordance with each of the above exemplary embodiments, additional steps may be employed to characterize a tire and/or improve the determined levels of a uniformity parameter resulting from measured crown thickness variation. For example, a quality characteristic associated with the tire may be determined based on the level of electronically calculated uneven mass distribution, radial run out, or high speed radial force variation. In another example, the tire mass may be removed or added to reduce levels of uneven mass distribution, radial run out and/or high speed radial force variation identified in the tire. In still other examples, new tires may be built to improve uneven mass distribution, radial run out and/or radial force variation based on knowledge of the electronically calculated uniformity parameters. Such improvement may be achieved by altering the relative location of different tire components or tire manufacturing aspects relative to the location of the crown thickness variation.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
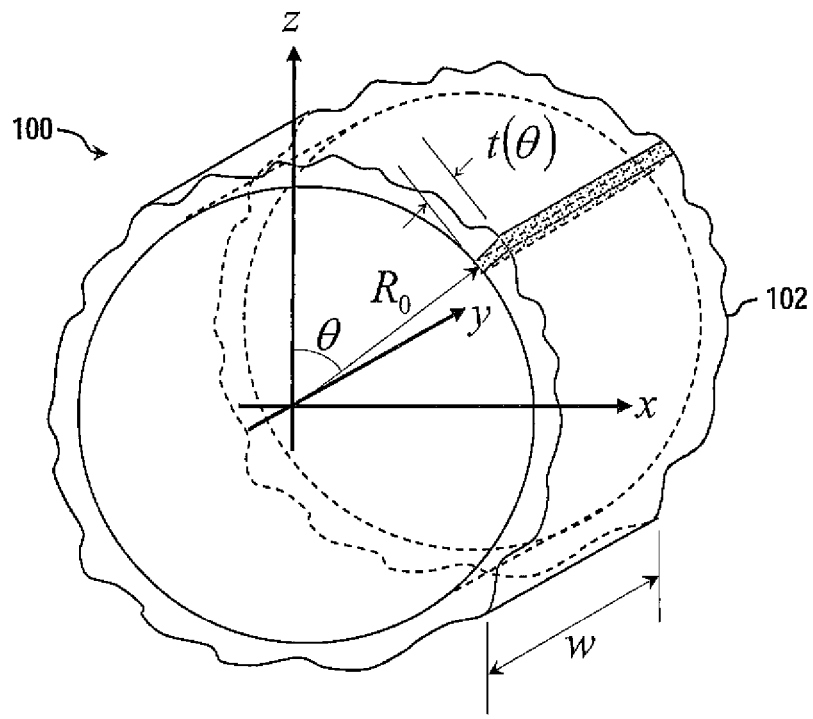
FIG. 1 illustrates a schematic perspective view of a tire with crown thickness variation and resulting uneven mass distribution.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is generally concerned with features and steps for predicting and controlling tire uniformity parameters such as high speed radial force variation and uneven mass distribution based on generated prediction models and other more easily measurable quantities, such as crown thickness variation. For example, some embodiments of the subject technology involve determining a predicted value of radial run out and/or uneven mass distribution from measured crown thickness variation. In other embodiments of the subject technology, high speed radial force variation is predicted from measured low speed radial force variation and crown thickness variation.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 2:
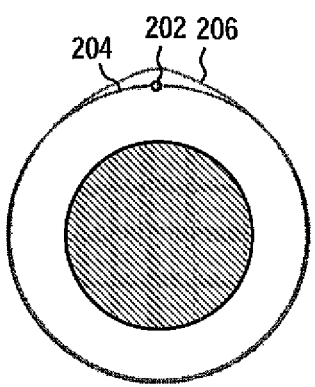
FIG. 2 provides an exemplary graphical representation of two-dimensional tire shape when a given point mass is added to the tire and the tire is rotated at different speeds, thus illustrating resultant radial run out.
Figure 3:
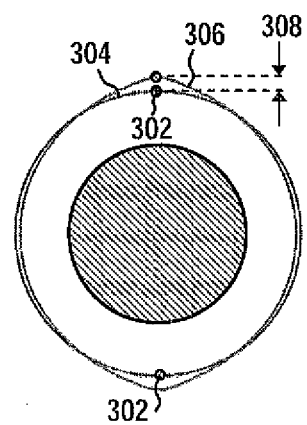
FIG. 3 provides an exemplary representation of two-dimensional tire shape when two point masses are added to the tire and the tire is rotated at different speeds, thus illustrating resultant radial run out.
Figure 5:
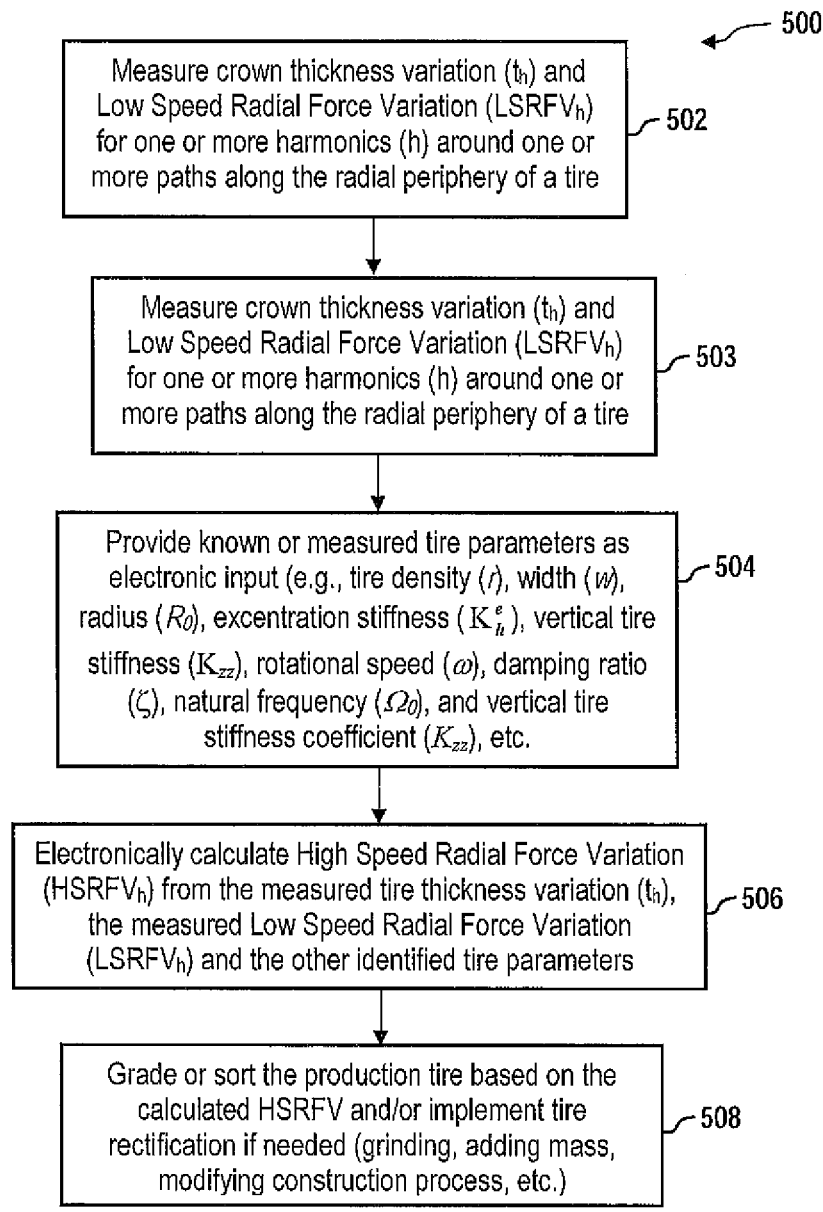
FIG. 5 provides a flow chart of exemplary steps in a method of electronically calculating high speed radial force variation from measured tire crown thickness variation and low speed radial force variation.
Figure 6:
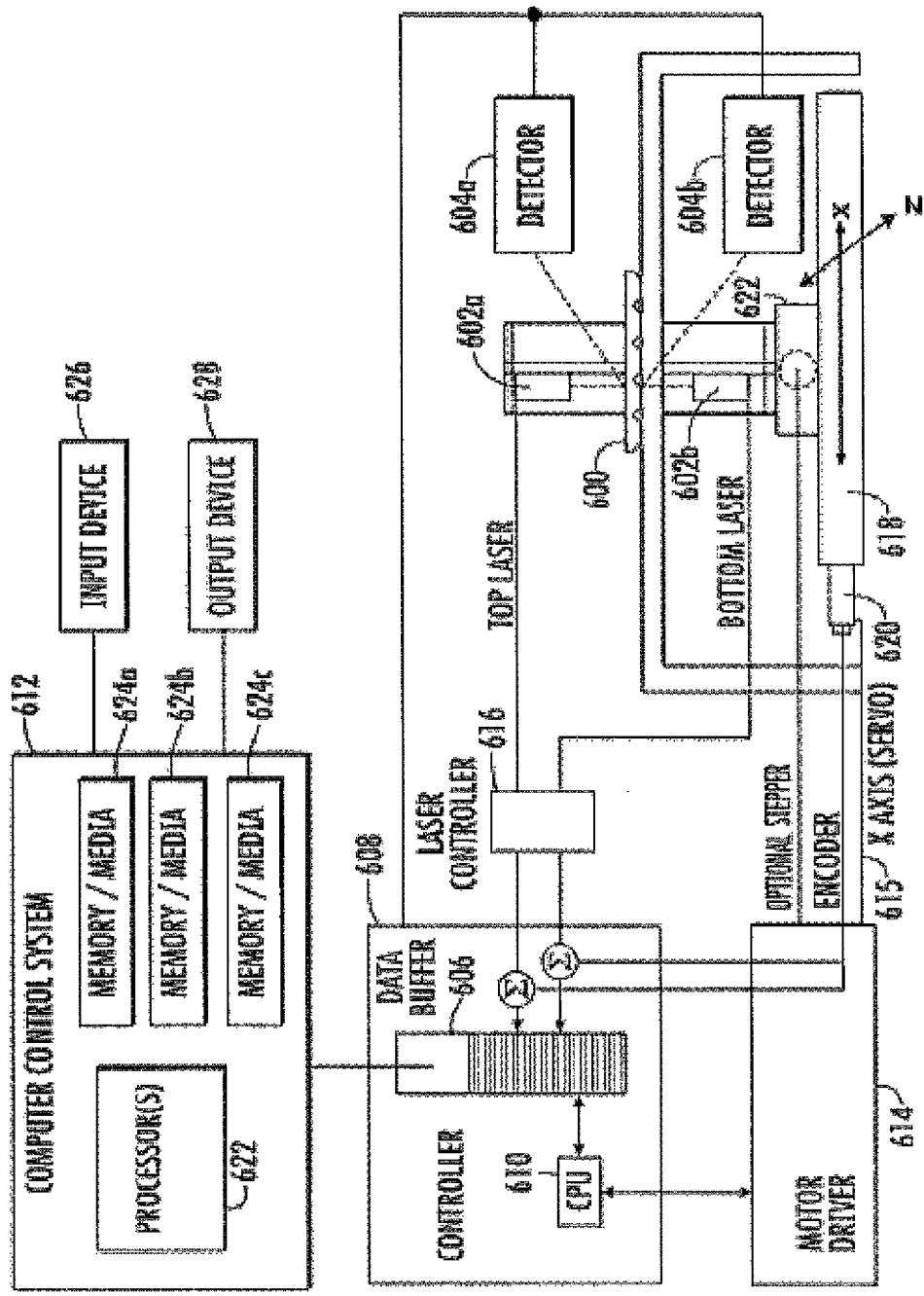
FIG. 6 illustrates a first embodiment of exemplary hardware components in a tire measurement system in accordance with the presently disclosed technology.
Figure 7:
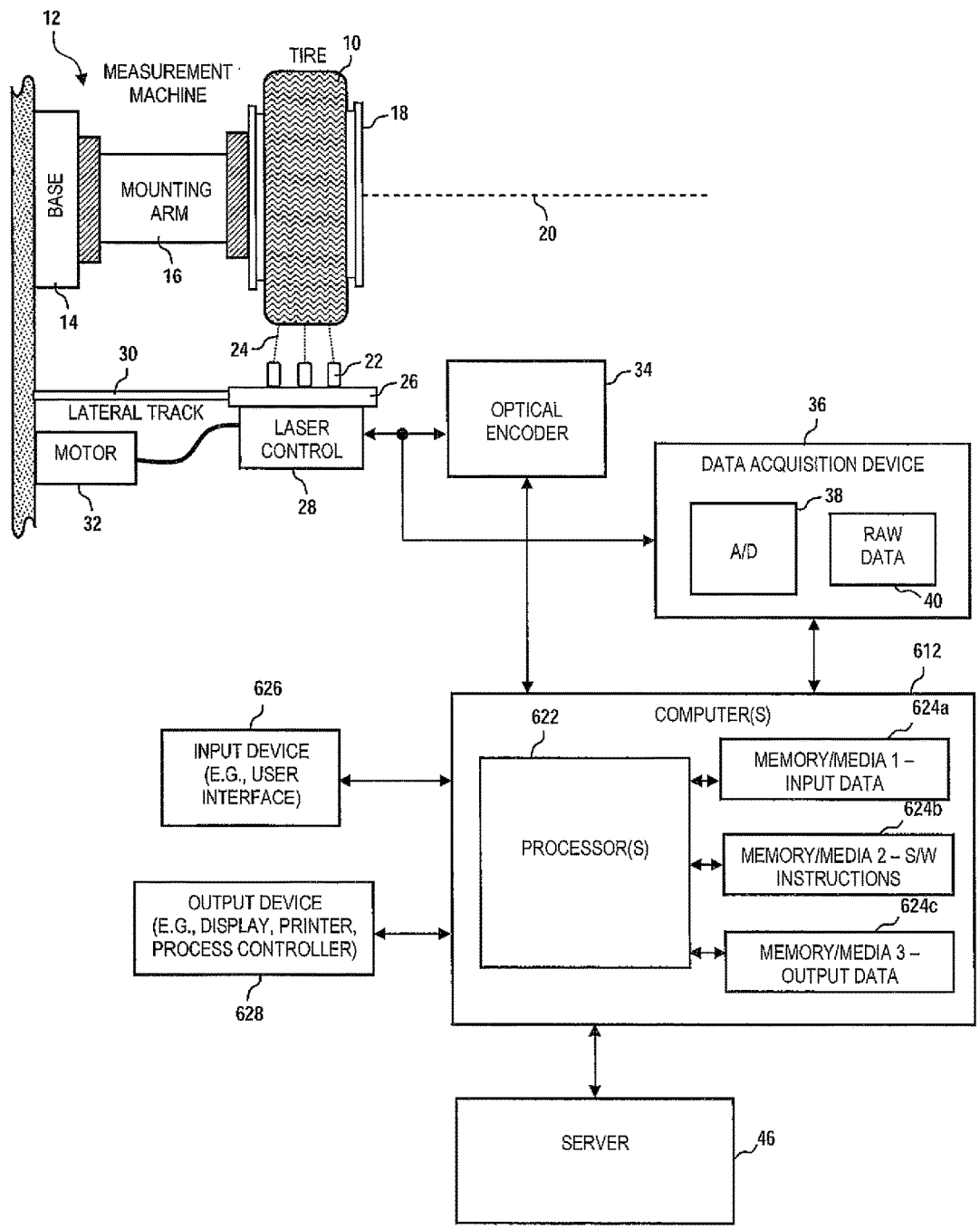
FIG. 7 illustrates a second embodiment of exemplary hardware components in a tire measurement system in accordance with the presently disclosed technology.
Figure 8:
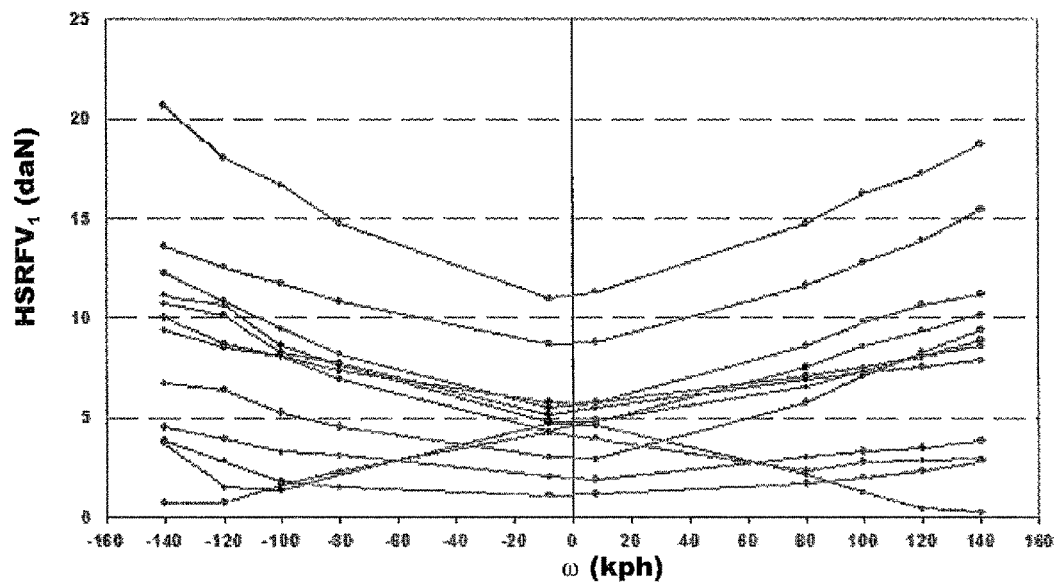
FIG. 8 provides a graphical illustration of radial force variation versus speed resulting from a given amount of tire crown thickness variation.
Figure 9:
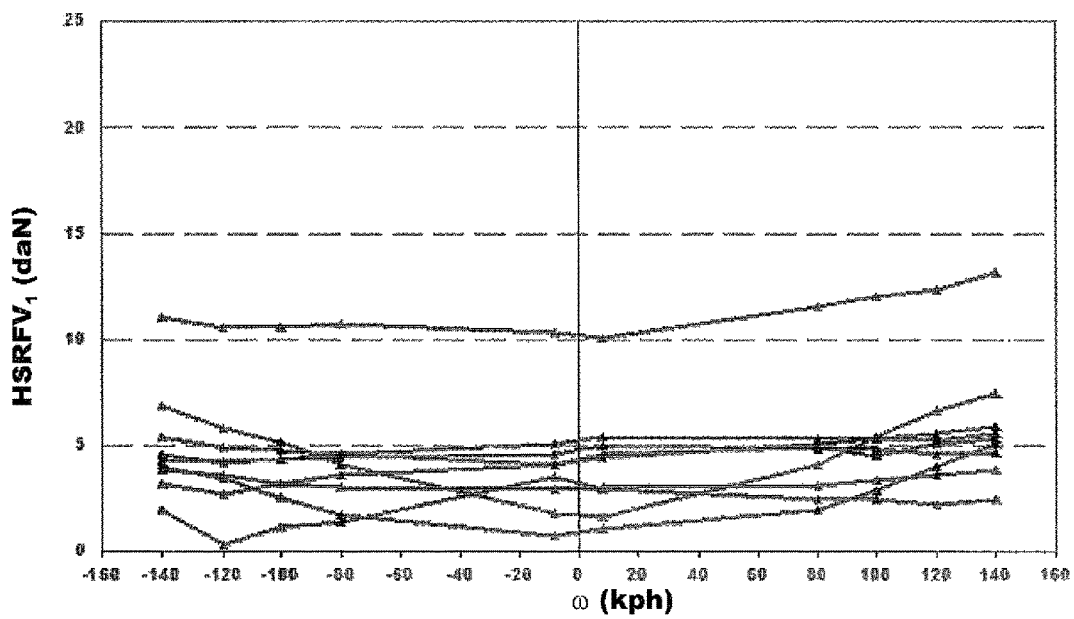
FIG. 9 provides a graphical illustration of radial force variation versus speed for a tire similar to that represented by the data of FIG. 8, after the tire is improved by controlling the resultant position of the given amount of tire crown thickness variation relative to carcass thickness variation.

Referring now to the drawings, a brief discussion of the theory behind the relationships among uneven mass distribution, radial run out, crown thickness, and related force variations is presented relative to FIGS. 1-3. An exemplary method of determining uniformity parameters such as uneven mass distribution and radial run out from crown thickness variation and related information is presented with reference to FIG. 4, while FIG. 5 is directed to an exemplary method of determining high speed radial force variation from low speed radial force variation, crown thickness variation and related information. FIGS. 6 and 7 variously show how tire measurements can be obtained using particular exemplary hardware features and measurement location options. FIGS. 8 and 9 provide exemplary data illustrating improvement in HSRFV by controlling the crown thickness variation location relative to other tire components or manufacturing features.

Referring first to FIG. 1, such drawing is intended to schematically represent the modeling of uneven mass distribution in a tire. In general, uneven mass distribution corresponds to the circumferential variation of the product of mass and radius. When rotated, the first harmonic of uneven mass distribution causes a rotating force at the hub center; it is typically referred to as mass imbalance or mass unbalance. This force is eliminated when appropriate balance weights are placed on the tire rim. When the distribution of mass around a tire is more uneven or nonuniform, a greater possibility exists of increased tire geometric variation (e.g., run out and the like) and/or force variations. Tire mass can be unevenly distributed in different locations across three dimensions of a tire carcass, and FIG. 1 represents such distribution relative to a three-dimensional coordinate system, where x is the horizontal coordinate, y is the lateral coordinate, and z is the vertical coordinate.

Referring still to FIG. 1, consider tire 100 having a crown product (e.g., tread) 102 circumscribing a uniform carcass. The carcass of tire 100 has a nominal radius $R_0$ and width w. The crown portion 102 of the tire has a thickness $t(\theta)$ that may vary at different angular locations ($\theta$) around the tire. The uneven mass distribution (UMD) associated with the crown product 102 in FIG. 1 can thus be characterized in terms of tire density $\rho$, nominal radius $R_0$, and the crown thickness variation $t(\theta)$. An equation relating the uneven mass distribution ($\overline{UMD}_h$) for a given harmonic (h) is more particularly given by the following:

$$\overline{UMD}_h = \frac{\pi}{2}\rho w R_0^2 \overline{t}_n, \quad (1)$$

where $\overline{t}_h$ is equal to the peak-to-peak thickness variation at harmonic (h). If density ($\rho$) is measured in kilograms per meter cubed (kg/m$^3$), and width (w), radius ($R_0$) and thickness variation ($t_h$) are all measured in meters (m), then uneven mass distribution is provided in units of kilograms*meters (kg*m).

When a tire has some uneven mass distribution as described above relative to equation (1), the tire can be modeled like a rotating spring with one end fixed and the free end attached to a differential mass. The centripetal force from rotation will stretch the spring proportionally to the product of the tire's differential mass and the rotational speed squared. The centripetal force and uneven mass distribution can also be related directly to the radial run out value for a rotated tire. More particularly, uneven mass distribution ($\overline{UMD}_h$) measured in kilogram-meters (kg*m) is related to centripetal force ($\overline{CF}_h$) measured in Newtons (N) and radial run-out ($\overline{\Delta RRO}_h$) measured in meters (m) by the following relationships, where $K_h^e$ is the excentration stiffness coefficient at harmonic h measured in kilograms per second squared (kg/s$^2$), and $\omega$ is the rotational speed of the tire in radians per second (rad/s):

$$\overline{CF}_h = \overline{UMD}_h * \omega^2 = K_h^e * \overline{\Delta RRO}_h. \quad (2)$$

In equation (2) above and in other instances throughout the specification describing "radial run out," it should be appreciated that such radial run out parameter ($\Delta RRO$) refers to the actual out of round variation in the radius of a tire, and is a differential parameter representing the difference between the radial run out of a tire measured at high speed (HSRRO—high speed radial run out) and the radial run out of a tire measured at low speed (LSRRO—low speed radial run out). In other words, $\Delta RRO = HSRRO - LSRRO$.

It should be further appreciated that equations (1) and (2) as well as others herein discussing uniformity parameters such as radial run out, uneven mass distribution, thickness variation, radial force variation and other parameters may focus not on the composite waveform of the measured or estimated parameter, but on one or more harmonic components thereof. The individual harmonics may be obtained by applying Fourier decomposition to the composite signal. As known in the art, Fourier analysis of a signal identifies the harmonics of that signal, where a harmonic is a sinusoidal (sum of sine and cosine terms) curve that passes an exact integral number of times through the composite waveform. Each harmonic component can be represented as its own waveform, or can be characterized as a vector having some magnitude and phase, where the magnitude or length of the vector is the peak-to-peak value of the harmonic waveform and the vector phase corresponds to the angle where the first peak of the harmonic waveform occurs. For waveforms consisting of a number of data points (d) around a tire (e.g., d=2048 data points), 1024 or d/2 harmonics can be calculated. The sum of these 1024 harmonics will pass through each of the 2048 data points. In general, the harmonics of interest that often provide the most useful information for analyzing and controlling tire performance parameters are the lower harmonics (e.g., H1, H2, . . . , H16 or so). In some embodiments, only the first one, two or three harmonics (H1, H2, H3) are analyzed, but more than just the first harmonic (H1) is preferred in many embodiments to obtain meaningful results.

The dimensional effect of uneven mass distribution as manifested in radial run out of a tire can be better appreciated with reference to FIGS. 2 and 3. Radial run out generally corresponds to the geometric deformation of the tire present when the tire is rotating at low or high speeds. Like most uniformity parameters measured for a tire, a composite waveform of run out measurements can be decomposed into discrete harmonic components. Most noticeable tire effects are manifested in the lower harmonics. FIG. 2 depicts first harmonic radial run out effects, while FIG. 3 depicts second harmonic radial run out effects.

Referring now to FIG. 2, uneven mass distribution contributing to the first harmonic of radial run out can be represented by a single concentrated mass 202. When a tire including mass 202 is stationary or rotated at a low speed, a surface measurement of the tire may be represented by the tire in a first state 204, which may correspond to radial run out measurements obtained when the tire is stationary or rotating at a low speed. The tire is also shown in a second state 206, which may correspond to radial run out measurements obtained when the tire is rotating at a high speed.

FIG. 3 depicts another exemplary representation of tire deformation due to uneven mass distribution of a tire, this time having two point masses 302 located thereon. Such two point masses 302 are generally configured such that they are about one-hundred eighty degrees (180°) out of phase with one another. The tire in FIG. 3 is shown in a first state 304, which again may correspond to radial run out measurements obtained when the tire is stationary or rotating at a low speed. The tire is also shown in a second state 306, which may correspond to radial run out measurements obtained when the tire is rotating at a high speed. FIG. 3 shows a difference 308 between a radial run out measurement in a first state 304 and a radial run out measurement in a second state 306.

The relationship of uneven mass distribution and radial run out to radial force variation can also be appreciated with reference to FIGS. 2 and 3. For tires having negligible stiffness variation, the primary mechanism of high speed radial force variation (HSRFV) is based on the centrifugation of the mass uneven distribution at high speed, in other words the radial run out. As such, it should be appreciated that as the centrifuged portion of the tire enters the contact patch, an additional radial force is required to crush this incremental increase in run out. This exemplifies how radial force variation depends from radial run out.

It should be appreciated that numerous advantages can be recognized from an effective phenomenological tire model, such as that developed above, particularly with respect to equations (1) and (2). In the context of the presently disclosed invention, such model is particularly useful far establishing a way to relate crown thickness variation to other tire parameters such as uneven mass distribution (UMD), radial run out (RRO) and radial force variation (RFV). Equation (1) provides a model for relating tire crown thickness variation ($\overline{t_h}$) to uneven mass distribution ($\overline{UMD_h}$). A combination of Equations (1) and (2) above provide a model for relating tire crown thickness variation ($\overline{t_h}$) to radial run-out ($\overline{\Delta RRO_h}$) as follows:

$$\overline{\Delta RRO_h} = \frac{\omega^2 \pi \rho w R_0^2 \overline{t_h}}{2 K_h^e} \quad (3)$$

Equation (3) above not only provides a way to directly correlate radial run-out to thickness variation, but it can also be used to help provide an estimation model for radial force variation since radial force variation is dependent on radial run-out. For example, consider the following speed-dependent calibration model for high speed radial force variation ($\overline{HSRFV_h}$):

$$\overline{HSRFV_h} = |A(h\omega)| Q(\angle A(h\omega)) [\overline{LSRFV_h} + K_{zz} * \overline{\Delta RRO_h}], \quad (4)$$

where $\overline{HSRFV_h}$ is the (h)-harmonic component of High Speed Radial Force Variation, A is an amplification factor, itself a function of the rotational speed ($\omega$), damping ratio ($\zeta$) and natural frequency ($\Omega_0$), $\overline{LSRFV_h}$ is the (h)-harmonic component of Low Speed Radial Force Variation, $K_{zz}$ is a vertical tire stiffness coefficient, and $\Delta RRO_h$ is the differential radial run out as defined by equation (3) above. More particularly, the amplification factor (A) is provided by:

$$A(h\omega) = \frac{1 + 2i\zeta \frac{h\omega}{\Omega_0}}{1 + 2i\zeta \frac{h\omega}{\Omega_0} - \frac{h^2 \omega^2}{\Omega_0^2}}, \quad (5)$$

where i is the imaginary number defined by $i=(-1)^{0.5}$. The angle function $\angle A(h\omega)$ is calculated by $$\angle A(h\omega) = \tan^{-1}\left(\frac{\text{Im}(A(h\omega))}{\text{Re}(A(h\omega))}\right), \quad (7)$$

where Im and Re refer to the imaginary and real part of A and Q is the rotation matrix given by $$Q(\theta) = \begin{bmatrix} \cos\theta & \sin\theta \\ -\sin\theta & \cos\theta \end{bmatrix}. \quad (6)$$

By substituting the equivalent parameters for radial run out ($\Delta RRO_h$) from equation (3) into equation (4), a relationship between HSRFV and measured crown thickness variation and LSRFV can be developed as follows:

$$\overline{HSRFV_h} = |A(h\omega)| Q(\angle A(h\omega)) \left( \overline{LSRFV_h} + \omega^2 \frac{K_{zz}}{K_h^e} \frac{\pi}{2} \rho w R_0^2 \overline{t_h} \right). \quad (8)$$

It should be appreciated that equation (8) above is a vector-based equation and thus provides information on both the magnitude and phase of the radial force variation. This particular information can be especially useful in certain applications of the disclosed technology. For example, if a tire needs to be corrected before or after cure by adding or removing rubber at certain locations, the specified angles of various determined uniformity parameters should be known.

Figure 4:
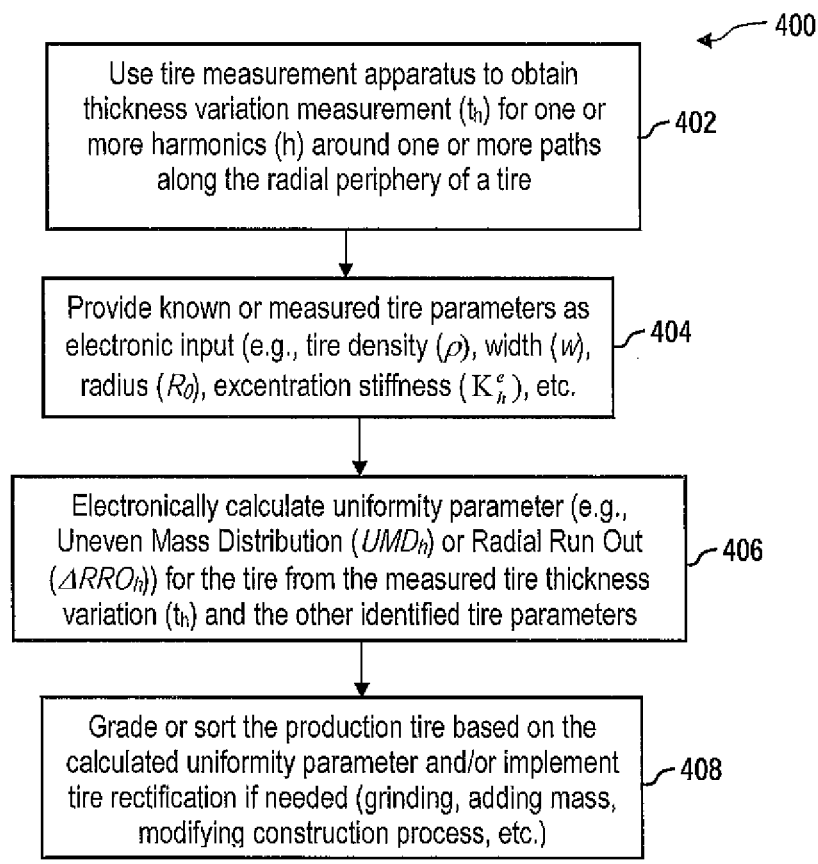
FIG. 4 provides a flow chart of exemplary steps in a method of electronically calculating a uniformity parameter such as uneven mass distribution or radial run out from measured tire crown thickness variation.

Referring now to FIG. 4, exemplary steps in a method 400 for electronically determining radial run out and/or uneven mass distribution levels for a production tire based on measured crown thickness variation values is disclosed. In further accordance with method 400, a first step 402 may involve using a tire measurement apparatus to obtain thickness variation measurements for one or more harmonics (h) around the 360 degree radial expanse of a tire. Because thickness variation is measured across the entire spectrum of angular locations around a tire, such parameter is represented herein as a vector quantity ($\overline{t_h}$) that includes for each data point a respective thickness magnitude and corresponding angle representative of the angular location around the tire circumference. Other similarly represented parameters in the present disclosure, including but not limited to radial run out, uneven mass distribution, and radial force variation are also represented herein as vector quantities.

Exemplary hardware apparatuses for measuring crown thickness variation are disclosed in and discussed with reference to FIGS. 6-7. Such figures generally show how a sheet-of-light laser system and/or single or multiple point-of-light laser sensors can be used to measure the thickness parameter ($t_h$) and/or radius ($R_O$) parameter represented in FIG. 1. Whether the thickness of the measured crown includes the tread portion only or the tread plus carcass and/or other specific portions of the tire may depend on the type of tire manufacturing process used and when during such manufacturing process the one or measurement are taken. As will be appreciated from the following description, crown thickness variation can be determined in a variety of ways, such as but not limited to measuring the entire crown thickness, measuring just the tread portion prior to being positioned on a carcass, or measuring the carcass and tread separately.

In a first embodiment of step 402, the crown thickness variation is measured for a tire built in accordance with a single stage process. In this exemplary process, a carcass is made on a confection drum, and is thus initially formed as a cylinder. The carcass is then loaded onto a finishing drum and inflated. The steel belts and tread are applied directly to the inflated carcass and a "green" tire is born. This "green" tire, also sometimes referred to in the literature as a "cover" or "bandage," represents the production tire before the curing process. In further accordance with a single stage manufacturing process, it should be appreciated that it may not be feasible to measure the crown thickness variation directly. Instead, the thickness variation or false round of the initial carcass can be measured along with the thickness variation or false round of the green tire. The crown thickness variation can then be determined via subtraction or regression of the measured carcass and green tire values.

In a second embodiment of step 402, the crown thickness variation is measured for a tire built in accordance with a two stage process, which is often a more conventional form of tire production. Some examples of a two-stage process involve similar formation of a tire carcass on a confection drum. As with the single stage process, the carcass is subsequently loaded onto a finishing drum and inflated. In other examples, the confection and the finishing drum can be one in the same, such that the carcass is ultimately built, inflated and finished all on the same drum. In each of these options, however, instead of applying the crown products directly to the inflated carcass, the crown products are first assembled as a crown package on an intermediate formation drum, and the crown package is transferred to the inflated carcass. In this formation option, the crown thickness variation would be measured while the crown package is still on the intermediate formation drum.

In a third embodiment of step 402, the crown thickness variation is measured for a tire built in accordance with a variation of the above-described two stage processes. In such example, a tire carcass is built on a confection drum, and is then transferred to a finishing drum and inflated. As in the single stage process, the steel belts are laid directly on the carcass. The tread, however, is laid on an intermediate formation drum before being transferred to the finishing drum. Crown thickness variation is measured for the tread while it is on the intermediate formation drum. As such, in this third exemplary embodiment, the crown thickness variation corresponds to a measure of the tread thickness level.

In a fourth exemplary embodiment of step 402, all tire products are laid on a solid core that has the shape of a finished tire. The thickness variation of the final tire product can be measured after completion of the green tire before curing. Such measurement can be compared with subtraction or regression to thickness measurements obtained at some point earlier in the process (e.g., after forming the tire carcass, after applying belts, before applying the tread, etc.)

Referring still to FIG. 4, a next step 404 involves identifying additional parameters that may need to be known about a tire in order to indirectly determine a tire's uniformity parameter from the crown thickness variation. Such parameters may be known from existing information about a test tire or may be measured in accordance with suitable techniques as readily understood by those of ordinary skill in the art. Exemplary parameters may include but are not limited to those previously disclosed with reference to the above equations (1)-(3), respectively, such as density ($\rho$), width (w), radius ($R_O$) and excentration stiffness coefficient ($K_h^e$).

In one example, density ($\rho$) corresponds to the mean density of the tire crown, which may be expressed as a "rule of mixtures" between the steel and rubber components of a tire. As understood by one of ordinary skill in the art, the "rule of mixtures" is a method of approach to estimating the density of a composite material based on an assumption that a composite property is the volume-weighted average of the components.

In one example, the excentration stiffness coefficient ($K_h^e$) is determined by analyzing the high speed radial run out effect on a tire with radius R. The tire is rotated at rotational speed ($\omega$) and the deflection, or radial run out, of the tire is determined. The h th harmonic of the run out ($u_h$) and other tire parameters can then be used to determine the excentration stiffness coefficient as follows: $K_h^e = m\omega^2 R/u_h$. An example of these parameters can be appreciated from FIG. 2. When one mass 202 is added within a tire, a run out signal is created; this run out can be decomposed into the h th harmonic of the run out ($u_h$). Such measured deflection value ($u_h$) can then be used to determine $K_h^e$, the excentration stiffness coefficient for the h harmonic.

In step 406, the crown thickness variation measured in step 402 and the additional tire parameters identified in step 404 are used to electronically calculate one or more uniformity parameters for the tire. In particular, such calculations may be determined by inputting the measured and/or determined tire parameters to a model such as described above with respect to equations (1)-(3). In one embodiment, the particular uniformity parameter that is determined in step 406 corresponds to the uneven mass distribution (UMD). In another embodiment, the particular uniformity parameter that is determined in step 406 is the radial run out (RRO).

Once the uniformity parameter, such as uneven mass distribution or radial run out, is determined in accordance with step 406, a variety of different resultant applications can be implemented in step 408. In general, the electronically calculated uniformity parameter(s) can be provided as electronic output to a user. Electronic output may be in the form of a printed output, graphical output on a monitor or other display device, or control signals provided to some other electronic device. More specific applications can also be implemented. In one exemplary embodiment, a quality characteristic associated with the analyzed tire is electronically identified based on the electronically calculated uniformity parameter. For example, such quality characteristic may correspond to a grade (A, B, C, D, F), a label (e.g., acceptable or unacceptable for delivery to a customer) or any other quality characteristic that may be associated with one or more categories having predefined limits of ranges for uneven mass distribution or radial run out within a tire. Such process may be implemented electronically by a computer comparing the determined uneven mass distribution and/or radial run out levels with certain electronically defined ranges for the quality characteristics. In another exemplary embodiment of the disclosed technology, depending on the determined level of uneven mass distribution in a production tire, such tire may also be subjected to a rectification step such as grinding or ablating or adding extra mass to the production tire to reduce levels of uneven mass distribution or radial run out.

In a still further exemplary embodiment of step 408, the construction process of a tire can be modified in order to improve the determined levels of uneven mass distribution or radial run out. For example, one or more aspects of the tire manufacturing process can be altered to minimize the resulting magnitude of tire crown thickness variation. In another example, the angular location of tire crown thickness variation can be arranged relative to the angular location of other aspects of a tire in order to reduce the resultant levels of radial run out and/or uneven mass distribution. Specific placement of tire components can help to offset the resultant overall magnitude of a tire uniformity parameter such as uneven mass distribution or radial run out. In particular, tire manufacturing may be improved by altering the location of tire crown thickness variation relative to other tire features so that the combined average magnitude of the tire crown thickness variation and the other tire features on a given uniformity parameter is smaller or negligible, thus compensating for the existence of such variations. Even when process effects are only reduced as opposed to removed, the cost of correcting tire uniformity will be reduced. For example, rectification procedures such as grinding the tread surface to improve tire uniformity will be implemented less often and in reduced quantities when required.

Other features in a tire manufacturing process that may be chosen or placed differently to offset tire crown thickness variation include but are not limited to aspects of the tire material components (e.g., the product start point or joint overlap location of one or more of casing textile plies, belt plies, bead rings, inner liner, tread and other rubber layers of the tires or size or width of such components such as the steel belt width), manufacturing techniques (e.g., the relative location in which a green tire is introduced on a building drum, placed into a mold or curing press, and the like), other resultant tire variations (e.g., the green tire false round, carcass false round (carcass thickness variation) and the like), and/or controllable conditions used in the tire construction process (e.g., the temperature and pressure at which green tires are subjected during the curing process or other manufacturing steps.)

Referring now to FIG. 5, another embodiment of the disclosed technology uses measured crown thickness variation to indirectly determine high speed uniformity performance of a tire, in particular the high speed radial force variation (HSRFV). In general, the presently disclosed technology uses measured tire crown thickness variation as well as measured low speed radial force variation in order to calculate an estimated value for high speed radial force variation. Many of the steps in the method 500 of FIG. 5 are similar to those used in the method 400 of FIG. 4. Where similar steps are used, the specifics discussed with reference to such steps in FIG. 4 will be noted and such specifics should be held as equally applicable to and incorporated by reference within the corresponding steps of FIG. 5.

A first exemplary step 502 in a method 500 for electronically determining high speed radial force variation for a production tire involves using a tire measurement apparatus to obtain thickness variation measurements ($\overline{t}_h$) for one or more harmonics (h) around the 360 degree radial expanse of a tire. This step 502 is similar to step 402, and can also be obtained in accordance with one or more different tire manufacturing processes as previously described, and using the exemplary hardware apparatuses presented with reference to FIGS. 6 and 7.

A second exemplary step 503 in the method 500 involves using a tire measurement apparatus to obtain low speed radial force variation measurements ($\overline{LSRFV}_h$) for one or more harmonics (h) around the radial expanse of the tire. The radial force variation may be obtained during the tire manufacturing process or after curing. Exemplary tire measurement apparatuses for use in measuring low speed radial force variation, include but are not limited to a tire force measurement machine such as that disclosed in U.S. Pat. No. 5,396,438 (Oblizajek).

In general, force variations referenced herein as being measured at "low speed" may correspond to measurements obtained while the tire has a rotational frequency of less than about 600 rpm (about 10 Hertz) in some embodiments, less than about 300 rpm (5 Hz) in other embodiments, less than about 100 rpm in still further embodiments, or other ranges or subranges between about 0 rpm and 600 rpm (0-10 Hz). Force variations referenced herein as being predicted or calculated for "high speeds" may generally correspond to speeds that would be representative of typical highway speeds. For purposes of the present subject matter, a "high speed" at which various measurements may be obtained and analyzed corresponds to a rotational frequency of at least about 600 rpm (about 10 Hertz) in some embodiments, at least about 800 rpm (about 13.33 Hertz) in other embodiments, between about 800 rpm and about 1600 rpm in still further embodiments, or other ranges or subranges between about 600 rpm and about 1800 rpm (10-30 Hz).

A third exemplary step 504 in the method 500 of FIG. 5 involves identifying additional parameters that may need to be known about a tire in order to indirectly determine a tire's high speed radial force variation (HSRFV$_h$) from the crown thickness variation (t$_h$) and low speed radial force variation (LSRFV$_h$). Such parameters may be known from existing information about a test tire or may be measured in accordance with suitable techniques as readily understood by those of ordinary skill in the art. Exemplary parameters may include but are not limited to those previously disclosed with reference to the above equations (1)-(8), respectively, such as density ($\rho$), width (w), radius (R$_0$), excentration stiffness coefficient (K$_h^e$), rotational speed ($\omega$), damping ratio ($\zeta$) natural frequency ($\Omega_0$), and vertical tire stiffness coefficient (K$_{zz}$). Determining the specific parameters in step 504 can be advantageous because they help provide a uniformity model that accounts for different tire stiffness levels across different harmonics, and accounts for variations across a tire crown in a more accurate model when considering different track locations.

Examples of how to determine some of the above tire parameters has been described with reference to FIG. 4. Examples of how to determine the damping ratio ($\zeta$), natural frequency ($\Omega_0$), and vertical tire stiffness coefficient (K$_{zz}$) are presented with reference to FIGS. 10 and 11.

Figure 10:
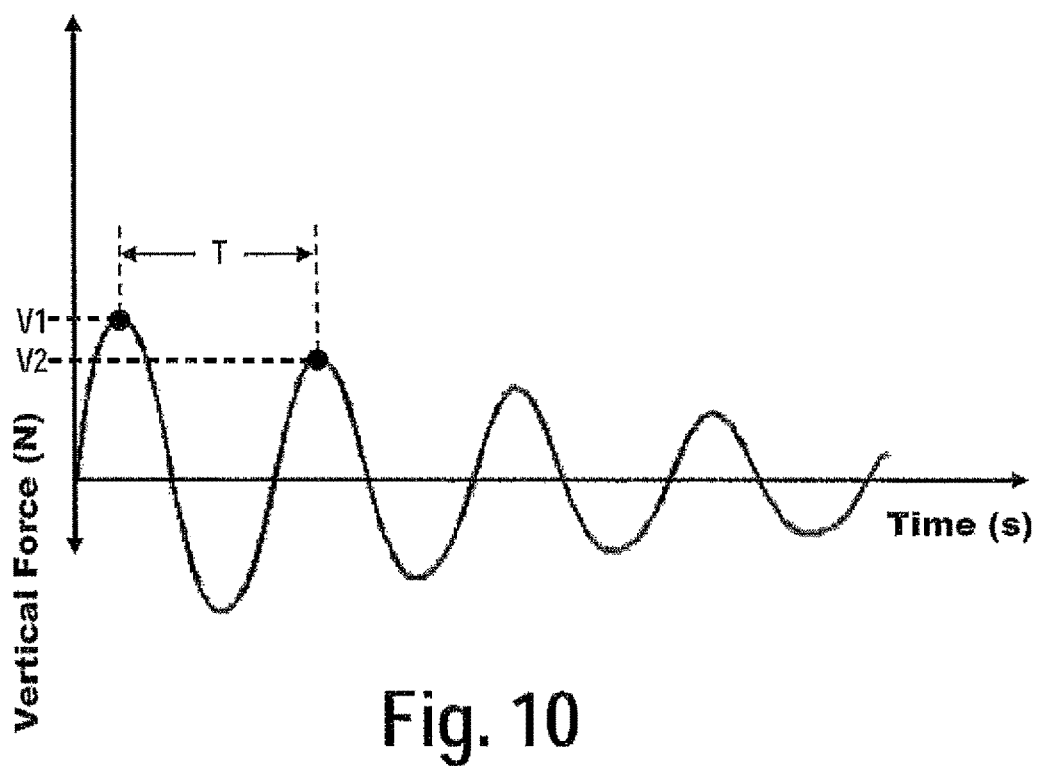
FIG. 10 provides a graphical illustration of an exemplary damped vertical force response of a tire subjected to cleat excitation, for use in determining such tire parameters as the damping ratio ($\zeta$) and natural frequency ($\Omega_0$)

FIG. 10 is a graphical representation of the damped response in vertical force that a tire experiences upon being excited by a cleat, which can be used to determine both the damping ratio (ζ) and natural frequency ($\Omega_0$) of the tire. The damping ratio (ζ) can be defined as follows:

$$\zeta = \frac{1}{\sqrt{1+\left(\frac{2\pi}{\delta}\right)^2}}, \text{ where } \delta = \ln\left(\frac{V1}{V2}\right),$$

and where V1 and V2 are determined as the vertical force at the first and second respective peaks within the damped response in FIG. 10. The natural frequency ($\Omega_0$) can also be determined from the damped response of FIG. 10, where $$\Omega_0 = \left(\frac{2\pi}{T}\right)\frac{1}{\sqrt{1-\zeta^2}},$$

and T is determined as the time between first and second peaks in the damped response of FIG. 10.

Figure 11:
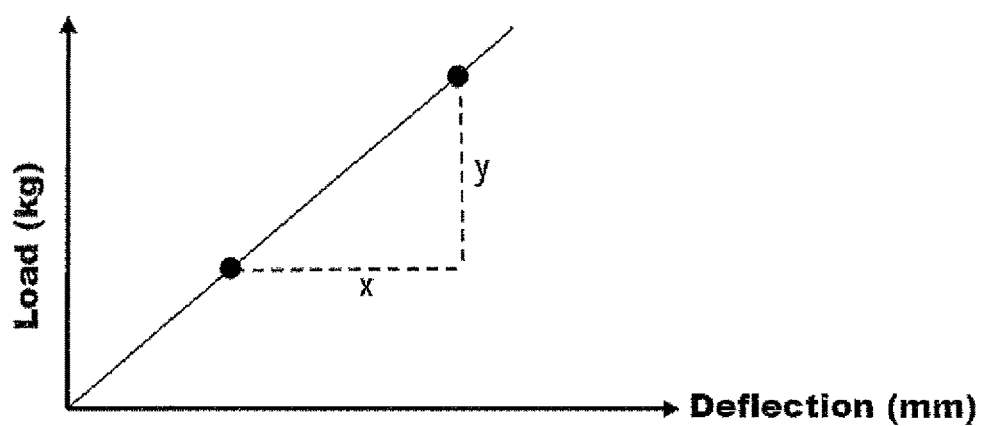
FIG. 11 provides a graphical illustration of an exemplary load-deflection curve for a tire, for use in determining such tire parameters as the vertical tire stiffness coefficient ($K_{zz}$).

FIG. 11 is a graphical representation of a load-deflection curve for a tire that may be used to determine the vertical tire stiffness coefficient ($K_{zz}$). Such load-deflection curve may be obtained by subjecting a test tire to different levels of load impact and determining the corresponding amounts of tire deflection. An exemplary machine that may be used to compute such values is a tire impact machine such as offered by Standards Testing Labs (STL), Inc. having facilities in Massillon, Ohio and San Angelo, Tex. An example of a generated load-deflection curve is shown in FIG. 11. The vertical tire stiffness coefficient ($K_{zz}$) is the slope of the load-deflection curve. As such, $K_{zz}$=y/x as indicated in the curve of FIG. 11.

Referring again to FIG. 5, the crown thickness variation measured in step 502, the low speed radial force variation measured in step 503 and the additional tire parameters identified in step 504 are used to electronically calculate in step 506 one or more harmonics or the composite spectrum of high speed radial force variation for the tire. In particular, such calculations may be determined by inputting the measured and/or determined tire parameters to a model such as described above with respect to equations (1)-(8), particularly equation (8).

Once the high speed radial force variation is determined in step 506, a variety of different resultant applications can be implemented in step 508. Such applications can be similar to those described above in step 408 and include but are not limited to one or more of sorting or grading tires, rectifying tires by grinding or removing mass, and/or altering the tire manufacturing process to reduce the resultant magnitude of high speed radial force variation.

Referring now to exemplary hardware features for accomplishing the subject crown thickness variation measurements, FIGS. 6 and 7 provide exemplary block diagrams of respective first and second hardware embodiments. These particular examples discuss measuring equipment that employs laser sensors, although it should be appreciated that other particular technologies for sensing and measuring one or more dimensions of a tire surface (e.g., ultrasonic, x-ray, rolling sensor, laser, camera or other technologies) may be used.

Referring now to FIG. 6, this particular embodiment may be useful for measuring thickness variation of the tread portion of a crown before application during tire formation. The element 600 whose thickness variation is to be measured may correspond to a pre-molded tread or other material component of a tire crown. First and second lasers 602a and 602b scan and sense the respective top and bottom surfaces of the tread 600. The illuminating output beams from lasers 602a and 602b (which may be one or more fixed point or sheet-of-light lasers) are reflected from the surfaces of tread 600 into respective detector elements 604a and 604b. The lasers and/or detectors may include focusing lenses and/or other optical filtering elements. Detectors 604a and 604b are able to determine relative positioning of the scanned surfaces and provide such measurement data to a data buffer or other memory storage device. The system of FIG. 6 provides features for obtaining profile measurements on both top and bottom surfaces, although it should be appreciated that evaluation of only a single surface is within the scope of the presently disclosed technology. In one example, the detectors 604a and 604b determine one coordinate of the measurement data (e.g., the y coordinate in the vertical direction) while encoder 615 tracks and provides a second coordinate (e.g., the x coordinate in the horizontal direction). In other examples, multiple coordinates (e.g., defining measurement data in two or three dimensions) are directly determined by the detectors 604a and 604b.

Referring still to FIG. 6, measurement data from detectors 604a and 604b are provided to one or more data buffers 606 in a profilometer controller 608. Controller 608 may also include one or more processors 610 capable of analyzing or otherwise processing the data stored in buffer 606 or otherwise relaying such stored data to other locations such as to a peripheral computer control system 612. Processor 610 may also be coupled to a motor driver 614 and laser controller 616. Motor driver 614 may adjust in multiple directions the location of a mounting base 618 onto which the illuminating lasers and receptors are mounted relative to the tread sample 600. For example, motor driver controls may be provided to servo 620 to adjust positioning as needed in the x direction of the horizontal plane and/or to optional stepper 622 to adjust positioning as needed in the z direction of the horizontal plane. Laser controller 616 provides output signals for controlling the positioning, power levels, timing and other parameters associated with lasers 602a and 602b. Although FIG. 6 shows an arrangement in which the lasers are provided in a fixed location and the measured surfaces can be adjusted, the system can alternatively be configured to provide controlled movement of the lasers while keeping the measured surface at a fixed location.

Jennifer. Do you think this would be a good place to put the thickness measurement of the cured tire that we discussed on the phone?

Computer control system 612 may generally include such components as at least one memory/media element or database for storing data and software instructions as well as at least one processor. In the particular example of FIG. 6, a processor(s) 622 and associated memory/media elements 624a, 624b and 624c are configured to perform a variety of computer-implemented functions (i.e., software-based data services). At least one memory/media element (e.g., element 624b in FIG. 6) is dedicated to storing software and/or firmware in the form of computer-readable and executable instructions that will be implemented by the one or more processor(s) 622. Other memory/media elements (e.g., memory/media elements 624a, 624c) are used to store data which will also be accessible by the processor(s) 622 and which will be acted on per the software instructions stored in memory/media element 624b. The various memory/media elements of FIG. 6 may be provided as a single or multiple portions of one or more varieties of tangible computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 6 shows three separate memory/media elements 624a, 624b and 624c, the content dedicated to such devices may actually be stored in one memory/media element or in multiple elements, Any such possible variations and other variations of data storage will be appreciated by one of ordinary skill in the art.

In one particular embodiment of the present subject matter, a first portion of memory/media 624a is configured to store input data for the subject tire uniformity determination system and related methods. Input data stored in memory/media element 624a may include raw measurement data exported from the data buffer 606 as measured by the laser-based profilometer equipment. Data in memory 624a may also include crown thickness variation levels determined from such raw data. Data in memory 624a may also include the tire parameters identified in steps 404, 503 and 504. Although such user-established limits and other input data may be pre-programmed into memory/media element 624a, they may also be entered as input data from a user accessing an input device 626, which may correspond to one or more peripheral devices configured to operate as a user interface with computer control system 612. Exemplary input devices may include but are not limited to a keyboard, touch-screen monitor, microphone, mouse and the like.

Second memory element 624b includes computer-executable software instructions that can be read and executed by processor(s) 622 to act on the data stored in memory/media element 624a to create new output data (e.g., the tire uniformity parameters such as uneven mass distribution, radial run out and high speed radial force variation electronically calculated in accordance with the disclosed models). Such new output data may be stored in a third memory/media element 624c. Such output data may be provided to a peripheral output device 628, such as monitor, printer or other device, or as control signals to still further components. Computing/processing device(s) 622 may be adapted to operate as a special-purpose machine by executing the software instructions rendered in a computer-readable form stored in memory/media element 624b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

It should be appreciated that alternative tire measurement devices may be useful when the tire crown portions are not provided in a lateral profile as shown in FIG. 6, but are instead mounted to a tire drum during formation or on a wheel rim after cure. In such instances, a tire measurement apparatus such as shown in FIG. 7 may be used. In such additional exemplary embodiment, a tire 10 is arranged on a mounting fixture within a measurement machine 12 and rotated centrifugally. In one embodiment, measurement machine 12 may generally include such exemplary features as a base 14, mounting arm 16 and mounting fixture 18. The mounting fixture 18 serves as a hub having similar qualities to a tire rim or other rigid disk configured to rotate centrifugally around a center line 20. Although the measurement apparatus illustrated in FIG. 7 is shown as accommodating tire mounting and rotation in the substantially vertical direction, similar to how a tire would rotate along a road surface, it should be appreciated that other mounting orientations are possible. For example, the tire and associated measurement equipment can alternatively be mounted to accommodate tire rotation in a substantially horizontal configuration.

Referring still to the measurement machine of FIG. 7, one or more sensors 22 are positioned relative to the tire 10. Sensors 22 may operate by contact, non-contact or near contact positioning relative to tire 10 in order to determine the position of the tire surface as it rotates about the center line 20. In one embodiment, sensors 22 are non-contact laser sensors. Each laser sensor includes a laser diode that projects a visible stream of light 24 onto the target surface of tire 10. The light reflected from each target spot is directed through an optical receiving system onto a position-sensitive element. In another example, one or more sensors 22 may correspond to a laser sensor configured to emit a sheet of light as opposed to a single stream or fixed point of light.

Although the sensors illustrated in FIG. 7 are configured to obtain measurements along the outside surface of a tire, it should be appreciated that such equipment can alternatively be oriented to take measurements along the inside surface of a tire. In some embodiments, sensors or other measurement devices can be arranged to obtain measurements along both the inner and outer surfaces of a cured tire such that one or more inner tire sensors circumferentially measure the interior tire surface runout, while one or more outer tire sensors circumferentially measure the outer tire runout. The crown thickness variation can then be determined by subtracting the 360-degree waveform obtained when circumferentially measuring the tire surface location along the interior surface of the finished tire from the respective 360-degree waveform obtained when circumferentially measuring the tire surface location along the exterior surface of the finished tire.

FIG. 7 illustrates three sensors 22 in order to obtain multiple sets of measurement data along a plurality of measurement tracks relative to tire 10. It should be appreciated that a fewer or greater number of sensors may be employed. It should be further appreciated that either the tire 10 or sensors 22 may be configured in different placement locations relative to one another. The positioning of laser sensors 22 may be varied in accordance with desired measurement tracks along a tire surface. If laser sensors 22 are mounted relative to a platform 26, the positioning of such platform 26 may be altered based on input to a laser control module 28 such that the platform 26 is capable of being moved along a lateral track 30 by motor 32. The platform 26 may also be moved in an angular position relative to a tire 10 so that inward adjustment of the laser sensors 22 can occur for optimum measurement ranges.

The measurement machine 12 and laser sensors 22 are interfaced with additional hardware components, including an optical encoder 34, data acquisition device 36 and other associated modules to collectively measure tire parameters and obtain raw data. In general, optical encoder 34 helps coordinate the geometric measurements at a plurality of data points around a peripheral surface location of a tire. This may be accomplished by providing a control signal defining a plurality of data points (e.g., 2048 data points at different angular positions around a tire periphery) and another control signal providing a once per revolution index pulse to synchronize data to a reference point on the measured tire. In general, the data acquisition device 36 converts measurements obtained from the sensor(s) 22 from analog to digital format via A/D converter 38 and stores the converted run out measurements as raw data in a memory device 40. The obtained tire measurements are ultimately provided to a computer 612 for post-measurement processing and uniformity parameter determination, similar to the computer and associated features as already described above with reference to FIG. 6.

Referring now to FIGS. 8 and 9, exemplary data is provided to show how tire uniformity parameters can be improved through offset of measured tire crown thickness variation with one or more other tire parameters. The specific example discussed with reference to FIGS. 8 and 9 addresses the methods for calculating high speed radial force variation as discussed above in FIG. 5. The specific example discusses calculation of only the first harmonic component of high speed radial force variation, although it should be appreciated that the disclosed techniques are equally applicable to other harmonics or multiple harmonics for this and other determined uniformity parameters.

FIG. 8 illustrates an example of the first harmonic of high speed radial force variation ($HSRFV_1$) measured in decanewtons (daN) plotted versus tire rotational speed measured in kilometers per hour (kph) for a plurality of tires, respectively represented by the plurality of lines in the graph. Positive speeds on the graph represent tire rotation in a clockwise direction, while negative speeds on the graph represent tire rotation in a counterclockwise direction. The $HSRFV_1$ data points are calculated from the $LSRFV_1$ and $t_1$ values measured for each tire while the crown was provided on an intermediate formation drum. In the data of FIG. 8, the resultant angular location of tire crown thickness variation was positioned 180 degrees out of phase with the resultant angular location of tire carcass variation, or carcass false round, that was also present in the tires. As shown, $HSRFV_1$ values frequently exceeded 5 daN at highway speeds of between about 100-140 kph, and even reached levels as high as 10-20 daN in some tires.

FIG. 9 shows the overall improvement in $HSRFV_1$ when the same test tires analyzed in FIG. 8 are modified by controlling the relative location of the tire crown thickness variation and the carcass false round. In particular, reduced levels of $HSRFV_1$ are achieved simply by controlling the tire manufacturing process and optimally positioning the resultant angular locations of crown thickness variation and carcass false round. In this example, optimal positioning is achieved by aligning the angle corresponding to the maximum magnitude of crown thickness variation with the angle corresponding to the maximum magnitude of carcass false round. As shown, $HSRFV_1$ values were generally limited to below about 5 daN for most tires operating at highway speeds of between about 100-140 kph, thus achieving a significant improvement relative to the values depicted in FIG. 8.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of electronically determining a uniformity parameter for a tire based on measured crown thickness variation, said method comprising:

measuring on a tire measurement apparatus the crown thickness variation for the tire, the crown thickness variation represented as a vector quantity comprising for each data point a thickness magnitude and corresponding angle representative of angular location around the tire circumference;

identifying tire parameters associated with the tire, wherein said tire parameters associated with the tire comprise tire density, width and radius; and electronically calculating one or more uniformity parameters for the tire from the measured crown thickness variation and the tire density, width, and radius, wherein said one or more uniformity parameters comprise one or more of uneven mass distribution of the tire and radial run out of the tire;

wherein said step of measuring on a tire measurement apparatus the crown thickness variation for the tire comprises obtaining a surface measurement for the tire carcass and obtaining a surface measurement for the carcass plus crown and determining the crown thickness variation by subtracting the obtained measurements.

2. The method of claim 1, wherein said step of measuring on a tire measurement apparatus the crown thickness variation for the tire comprises measuring a profile surface of a tread portion of the tire.

3. The method of claim 1, wherein said step of measuring on a tire measurement apparatus the crown thickness variation for the tire comprises obtaining a surface measurement for the crown portion after the crown portion is provided on an intermediate formation drum.

4. The method of claim 1, wherein said step of measuring on a tire measurement apparatus the crown thickness variation for the tire comprises subtracting a waveform obtained when circumferentially measuring surface location of an interior surface of the tire from a corresponding waveform obtained when circumferentially measuring surface location of an exterior surface of the tire.

5. The method of claim 1, wherein said step of electronically calculating one or more uniformity parameters comprises calculating uneven mass distribution ($UMD_h$) for one or more harmonics (h) using the following model:

$$\overline{UMD_h} = \frac{\pi}{2} \rho w R_0^2 \overline{t_h},$$

where $t_h$ represents the crown thickness variation for one or more harmonics (h).

6. The method of claim 1 wherein said tire parameters further
includes a stiffness coefficient ($K_h^e$), and wherein said step of electronically calculating one or more uniformity parameters comprises calculating radial run out (.DELTA.RRO.sub.h) for one or more harmonics (h) using the following model:

$$\overline{\Delta RRO_h} = \frac{\omega^2 \pi \rho w R_0^2 \overline{t_h}}{2 K_h^e}.$$

7. The method of claim 1, further comprising a step of electronically identifying a quality characteristic associated with the tire based on a level of electronically calculated uneven mass distribution or radial run out.

8. The method of claim 1, further comprising a rectification step comprising one or more of grinding or adding extra mass to the tire to reduce levels of uneven mass distribution or radial run out identified in the tire, or building a new tire to improve uneven mass distribution or radial run out based on knowledge of the electronically calculated uneven mass distribution or radial run out due to crown thickness variation.

9. A method of electronically determining a uniformity parameter for a tire based on measured crown thickness variation, said method comprising:

measuring on a tire measurement apparatus the crown thickness variation for the tire, the crown thickness variation represented as a vector quantity comprising for each data point a thickness magnitude and corresponding angle representative of angular location around the tire circumference;

identifying tire parameters associated with the tire, wherein said tire parameters associated with the tire comprise tire density, width and radius; and electronically calculating one or more uniformity parameters for the tire from the measured crown thickness variation and the tire density, width, and radius, wherein said one or more uniformity parameters comprise one or more of uneven mass distribution of the tire and radial run out of the tire;

wherein said step of measuring on a tire measurement apparatus the crown thickness variation for the tire comprises subtracting a waveform obtained when circumferentially measuring surface location of an interior surface of the tire from a corresponding waveform obtained when circumferentially measuring surface location of an exterior surface of the tire.

* * * * *